United States Patent [19]
Chamings

[11] Patent Number: 5,906,327
[45] Date of Patent: May 25, 1999

[54] PRETENSIONER OR BELT TIGHTENER

[75] Inventor: Antony W. Chamings, Oxford, Mich.

[73] Assignee: Breed Automotive Technology, Inc., Lakeland, Fla.

[21] Appl. No.: 09/024,227

[22] Filed: Feb. 17, 1998

[51] Int. Cl.⁶ .................................................. B60R 22/46
[52] U.S. Cl. ......................... 242/374; 280/806; 297/480
[58] Field of Search ........................... 242/374; 280/806; 297/478, 480

[56] References Cited

U.S. PATENT DOCUMENTS

| | | | |
|---|---|---|---|
| 4,434,953 | 3/1984 | Gemar et al. | 242/374 |
| 4,750,686 | 6/1988 | Fohl | 242/374 |
| 5,443,222 | 8/1995 | Modinger et al. | 242/374 |
| 5,634,690 | 6/1997 | Watanabe et al. | 242/374 |
| 5,641,131 | 6/1997 | Schmid et al. | 242/374 |
| 5,699,976 | 12/1997 | Hori | 242/374 |
| 5,782,423 | 7/1998 | Miller, III et al. | 242/374 |

*Primary Examiner*—John M. Jillions
*Attorney, Agent, or Firm*—Markell Seitzman

[57] ABSTRACT

An apparatus (20, 400) comprising: a gear (402) operatively linked to a rotationally supported spool (20) to rotate the spool (24) in a direction of retraction to cause a seat belt (22) wound thereabout to retract; a belt tightener comprising: a gear unit (410) having a first drive member (412) which is initially uncoupled from the gear (402) and which as it rotates is placed into driving engagement with the gear (402) and which upon further rotation is moved to a condition of disengagement with the spur gear to permit the spool to rotate free of the pretensioner and a rack (420) operably connected to the gear unit to cause same to rotate.

19 Claims, 8 Drawing Sheets

PRETENSIONER OR BELT TIGHTENER

BACKGROUND AND SUMMARY OF THE INVENTION

The present invention generally relates to a safety restraint device for protecting vehicle occupants and more particularly a pretensioning or belt tightening device typically used to tension, i.e. tighten, a seat belt wound about a seat belt retractor or attached to that portion of the seat belt connected to a buckle.

Pretensioners or belt tighteners, as they are also called, are currently used in industry to operate in conjunction with seat belt retractors or are attached to one end of the belt that is connected to a seat belt buckle. A typical pretensioner for a seat belt retractor or buckle comprises a movable piston joined to a cable. The piston typically moves down a straight tube. The use of the straight tube creates packaging problems within the vehicle, as it is difficult to orient the tube within the room that is made available. Retractor pretensioners also use clutches to decouple the pretensioner from the retractor so that the pretensioner does not interfere with the normal operation of the retractor. Another type of pretensioner or belt tightener is shown in FIG. 8. This pretensioner 500 includes a gear 502 rotatable with the retractor spool 503. A movable rack having a set of teeth 506 for engagement with the teeth of the gear 502 is disclosed within a longitudinal channel 508 formed in a housing 510. A pyrotechnic unit 512 is disposed below the rack and upon activation pushes the rack upward thereby rotating the gear 502 and causing the spool to reverse wind a seat belt thereon. Even when the rack is moved to its uppermost position, it is still engaged with the gear 502. As can be appreciated, this type of pretensioner or belt tightener must also employ a separate clutch to permit the spool to rotate during normal operation so as to be divorced from the influence of the rack. These clutches typically increase the package size of the restraint device. The clutches are often intricate devices which complicate the operation of the pretensioner and add to its cost. The clutch can be eliminated if the rack (of FIG. 8) is permitted to be pushed into a void in the top of the housing (such that the rack disengages with the teeth of gear 502), however, this would increase the length of the housing. Further, in view of the dimensional tolerances that must be used, the rack of this type of pretensioner is prone to move side-to-side increasing the tooth-to-tooth loading which increases friction, decreases performance, increases noise and may cause the teeth to bind. Additionally, any side loading may cause the rack teeth to bite into the walls of the bore further decreasing performance.

It is an object of the present invention to provide a pretensioner that is devoid of the problems of the prior art. A further object of the present invention is to provide a simple, compact and reliable pretensioner that can be used with a seat belt retractor or a seat belt buckle. Another object of the present invention is to provide a pretensioner or belt tightener which avoids the need to use a separate clutching mechanism.

Accordingly the invention comprises: an apparatus comprising: a spur gear operatively linked to a rotationally supported spool to rotate the spool in a direction of retraction to cause a seat belt wound thereabout to retract; a belt tightener comprising: a gear unit having a first drive member which is initially uncoupled from the driven means and which as it rotates, is placed into driving engagement with the spur gear and which upon further rotation is moved to a condition of disengagement with the spur gear to permit the spool to rotate free of the pretensioner and a rack operably connected to the gear unit means to cause same to rotate.

Many other objects and purposes of the invention will be clear from the following detailed description of the drawings.

DETAILED DESCRIPTION OF THE DRAWINGS

Figure 1:
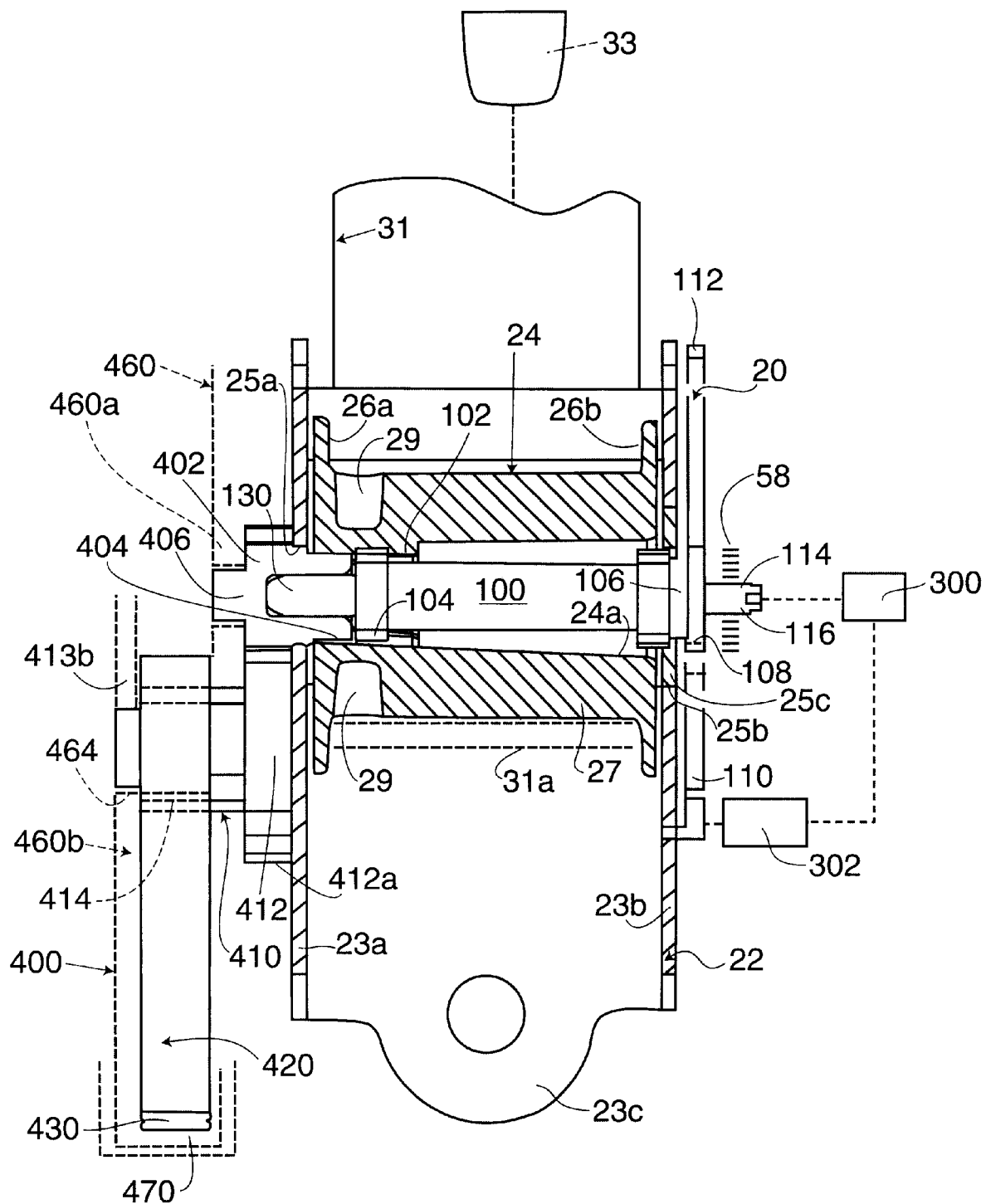
FIG. 1 illustrates a cross-sectional view of a seat belt retractor and pretensioner illustrating some of the major components of the present invention.
Figure 2:
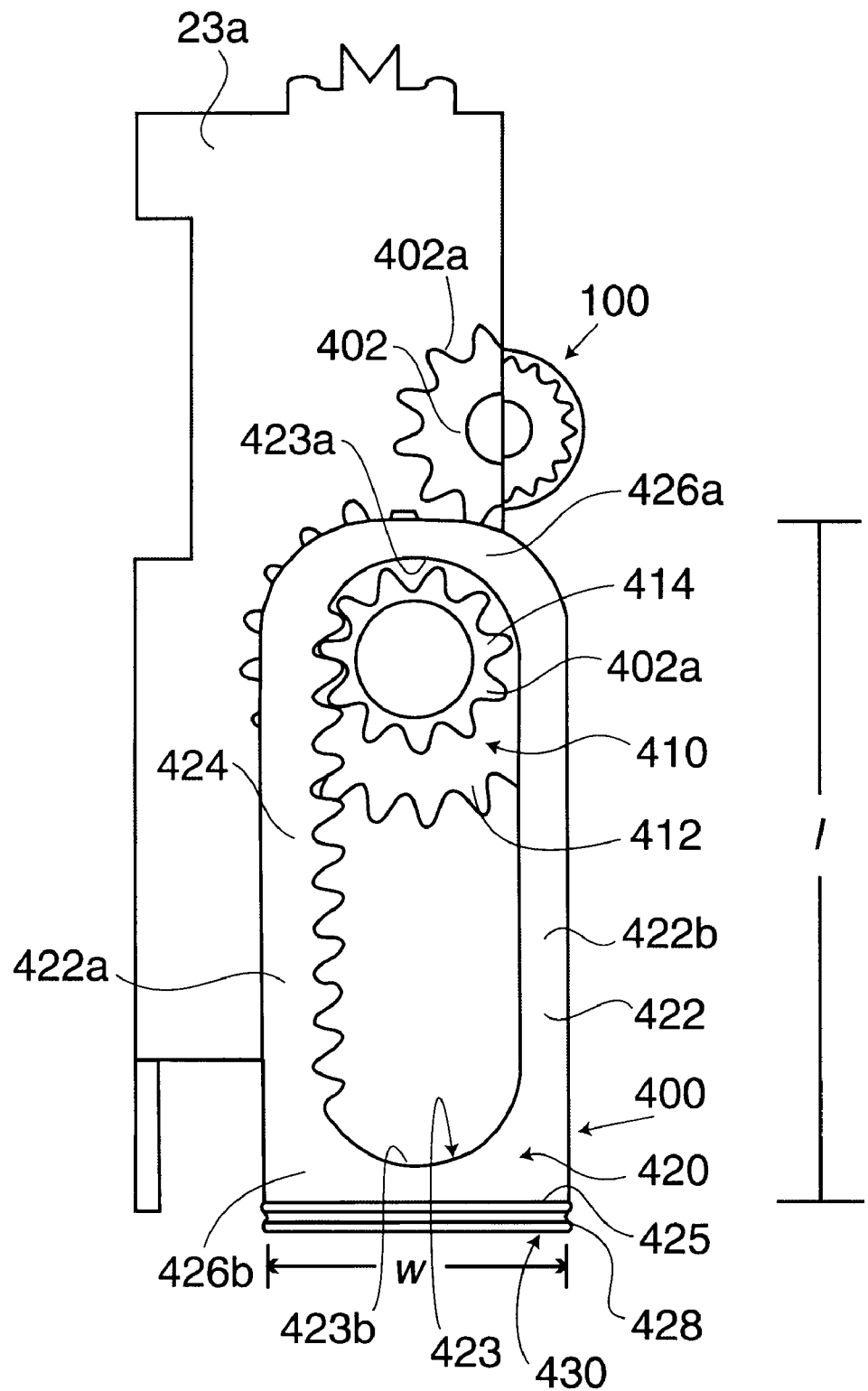
FIG. 2 is a partial side view illustrating a pretensioner in a deactivated mode of operation. The right hand side of the frame is shown truncated.

Reference is made to FIGS. 1 and 2 which illustrate a seat belt retractor 20 operating in concert with a pretensioner 400. The retractor 20, as illustrated, is an energy absorbing retractor having a means for absorbing or dissipating crash energy and for permitting the occupant during the crash to move forward in a controlled manner. Typically these energy-absorbing retractors may include a crushable bushing which when crushed permits the controlled protraction of the seat belt. As illustrated, retractor 20 includes a torsion bar 100 which when twisted also permits the controlled protraction of the seat belt from the spool when loaded by the occupant during a crash. It should be appreciated that the pretensioner can operate with any retractor. The retractor 20 comprises a U-shaped frame 22 adapted to be connected to a part of a vehicle body or to a part of an occupant seat. The frame includes frame sides 23a,b having respective openings 25a and 25b and a rear or connecting part 23c typically having an opening for receipt of a fastening bolt. The retractor additionally includes a spool or reel 24 rotatably mounted to one side of the torsion bar 100. The torsion bar 100 is supported for rotation in the openings 25a and 25b which act as bearings. Alternatively, separate bushings can be inserted in the openings 25a and 25b. FIG. 1 shows a separate bushing 25c inserted into opening 25b. This bushing 25c can be a stationary part of a lock cup assembly which includes a web and/or vehicle sensor. The spool optionally includes two (2) flanges 26a and 26b. The seat belt webbing 31 is wound around a center part 27 of the spool (a few layers of webbing 31a are shown in dotted line). The center part 27 of the spool 24 includes a slot (not shown) which provides a means for receiving and securing one end of the seat belt 31 into the spool in a known manner.

The spool 24 may be of integral construction having extending stub axles which are rotationally supported in bushings in the frame or the spool 24 may be supported by a separate shaft, that is, the torsion bar 100 which is itself rotationally supported as mentioned above. The torsion bar 100 is received within a bore 24a of the spool 24. The left hand side of the bore 24a includes splines 102 which mate with splines 104 formed on the torsion bar to rotationally join the torsion bar to the spool. The torsion bar includes a right hand first portion 106 having splines 108 upon which is mounted a lock wheel 110 having lock teeth 112. The torsion bar 100 further includes a narrow extension 114 having a forked end 116 that forms a spring arbor and is adapted to receive a rewind spring 58, of known construction, to retract the extended seat belt.

The retractor additionally includes a web sensor 300 and a vehicle sensor 302 which are used to initiate the lockup of the lock wheel during an emergency. These sensors respectively sense excessive vehicle deceleration and an excessive rate increase of seat belt protraction from the retractor 20. One such vehicle sensor 302 and web sensor 300 are diagrammatically shown in FIG. 1. In reality the web sensor may be nestled within a lock cup which is received adjacent a lock wheel. The vehicle sensor is carried by the lock cup and includes a sensor pawl that engages ratchet teeth on the lock cup. Movement of the lock cup moves (rotates) a lock pawl 120 into engagement with the lock teeth 112. European Patent Document EP 0 228 729 A1 is illustrative of a retractor having a web sensor, vehicle sensor, and lock cup to move the lock pawl into engagement with the a lock wheel. This document is incorporated herein by reference. Any number of sensor configurations may be used in the present invention. The right hand portion of the retractor would be covered by a known type of housing member (not shown).

The left side, splined end of the torsion bar 100 includes a rod-like extension 130. A spur gear 402 of the pretensioner 400 is slidingly received on the extension 130. The right hand side of the spur gear includes splines 404 which matingly engage the splines 102 of the spool 24 so that the gear 402 can directly drive the spool 24. The spool 24 includes two opposing cavities 29 above the various splines. A tool is inserted into each cavity 29 to deform the spool so that it deforms splines 102 to engage the splines on the gear 402 and on the torsion bar 100.

Figure 5:
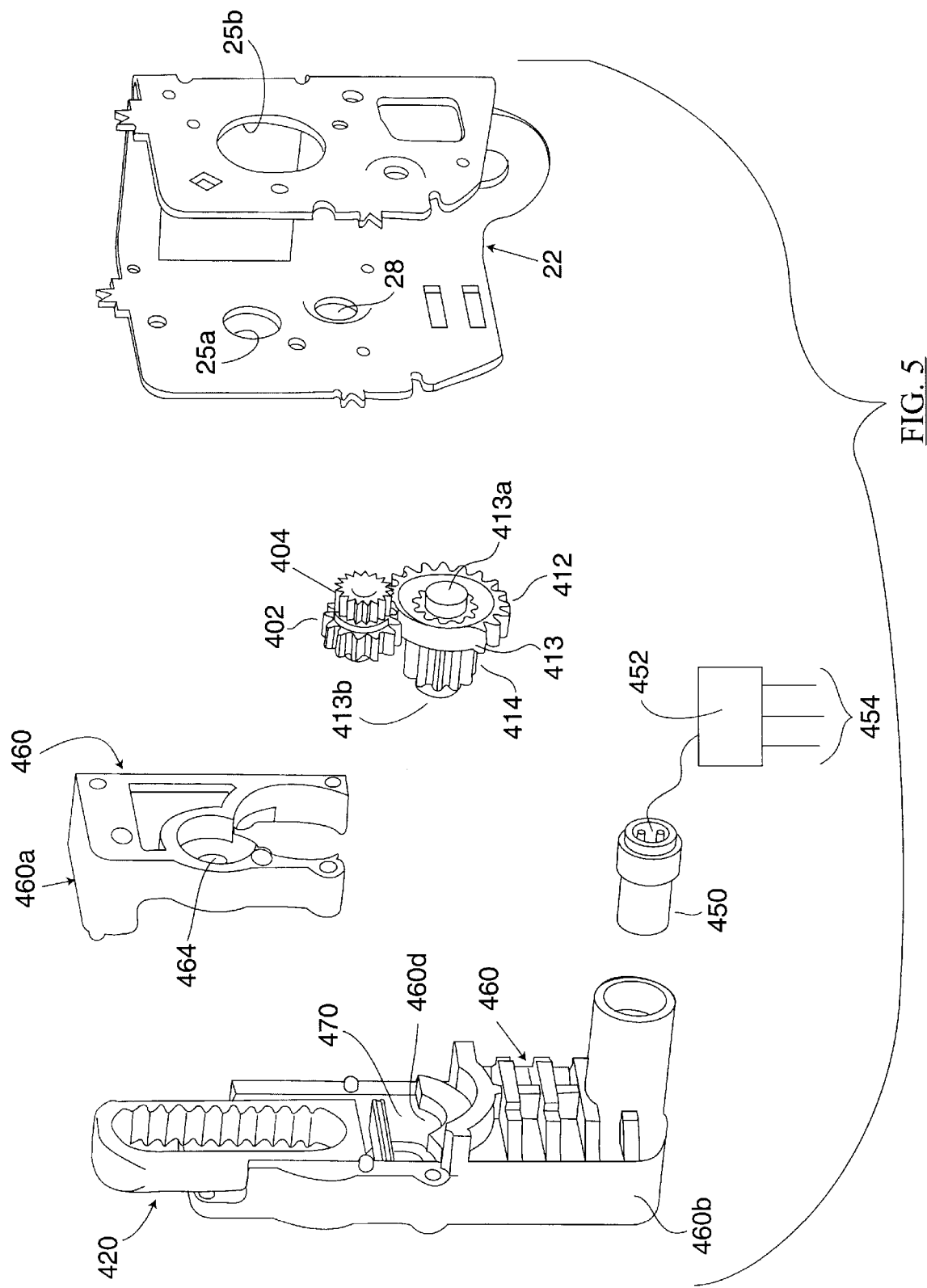
FIG. 5 is an assembly view of the present invention showing the frame, gear unit driver gear, a two-part housing, rack and pyrotechnic unit. The spool and torsion bar have been removed for clarity.
Figure 6:
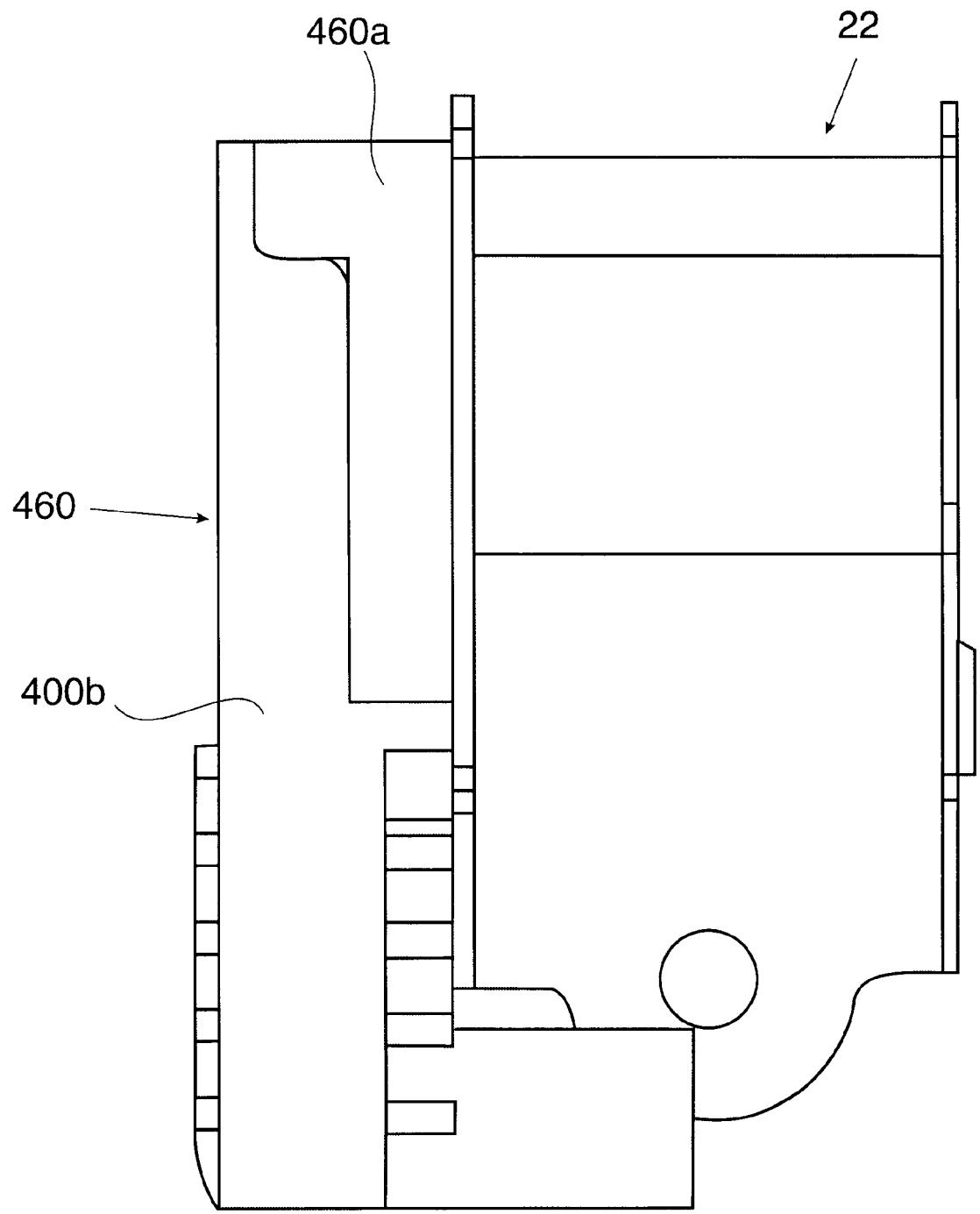
FIG. 6 is a front plan view showing the housing portions of the pretensioner and frame.
Figure 7:
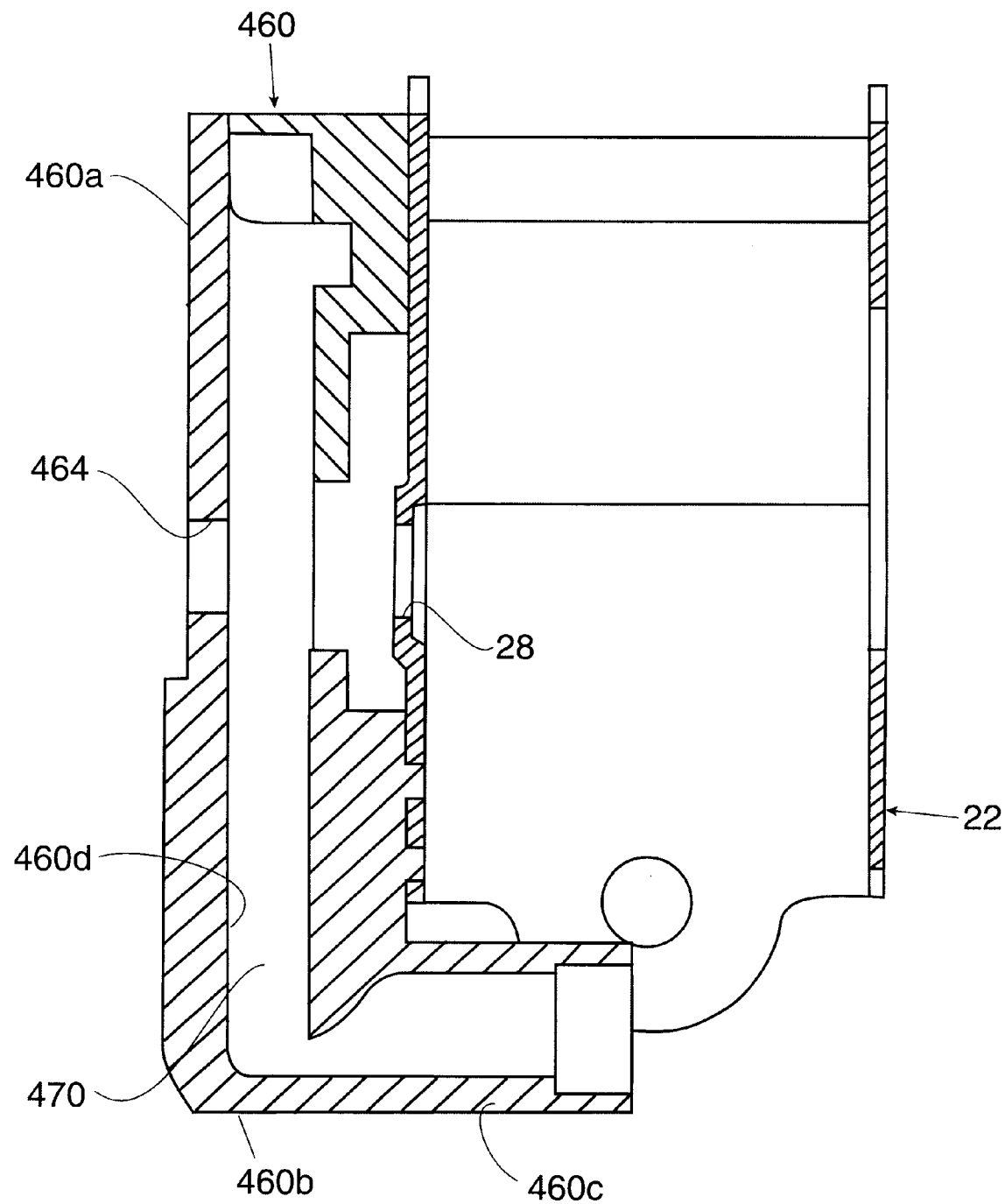
FIG. 7 is a cross-sectional view based upon FIG. 6 showing the interior passages in the housing.
Figure 8:
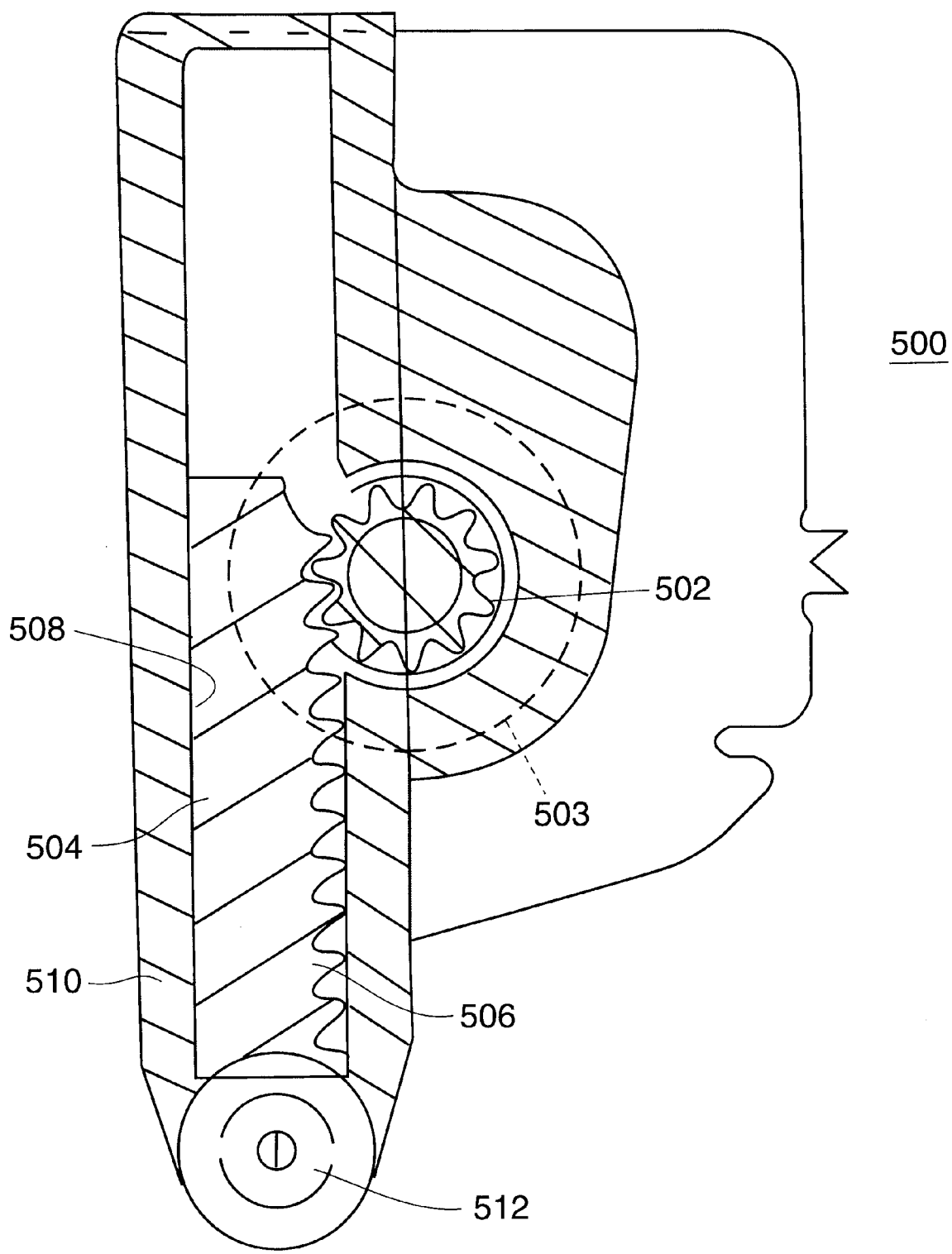
FIG. 8 is illustrative of a prior art pretensioner.

The pretensioner 400, in addition to the spur gear 402 (which as mentioned is rotationally linked to the spool 24) includes a step-up gear unit 410 (comprising a large diameter gear 412 and a smaller diameter gear 414), and a movable rack 420 which is powered by a pyrotechnic unit 450 (see FIG. 5). Various components of the pretensioner are enclosed by a protective multi-part housing generally shown as 460 (see FIGS. 1, 5 and 7). As will be seen, the rack 420 is hollow and double sided which, in combination with tracks or guide surfaces of the housing, guides the rack into precise mating engagement with the smaller diameter spur gear 414 thereby avoiding the bottoming-out of the rack and spur gear teeth. By controlling the tooth-to-tooth engagement of the rack and gear this pretensioner will display lower friction and noise than offered in the prior art. The broader aspect ratio of the present invention, that is, the ratio of the width (w) to the length (L) (for a given depth or thickness) of the rack 420, in combination with the interior wall or channels in the housing 460, stabilizes the rack within the housing 460 and further provides a greater surface area to receive propulsion gases thereby increasing the force applying capability of the present invention.

The spur gear 402 includes teeth 402a and a stub axle 406 rotationally supported in a housing section 460a. The housing section 460a may be made of plastic or brass to provide a bushing support for the stub axle 406. The step-up gear unit 410 includes a stub axle 413a (see FIG. 5) which is rotationally supported within an opening 28 in the frame side 23a and a second stub axle 413b rotationally supported in an opening 464 in a housing part 460b which is only partially shown (see FIGS. 1 and 5). The large diameter gear 412 includes gear teeth 412a which only extend about a portion of the circumference of gear 412. A first tooth 412b is truncated to prevent a situation wherein the resultant force between teeth 412 and teeth 402 extends through the center of each gear. In this situation the gears would not rotate. As can be seen, a sector 413 of approximately 115° does not have any gear teeth. As will be seen from the discussion below the gear teeth 412a drivingly engage and disengage the teeth 402a of spur gear 402.

Figure 3:
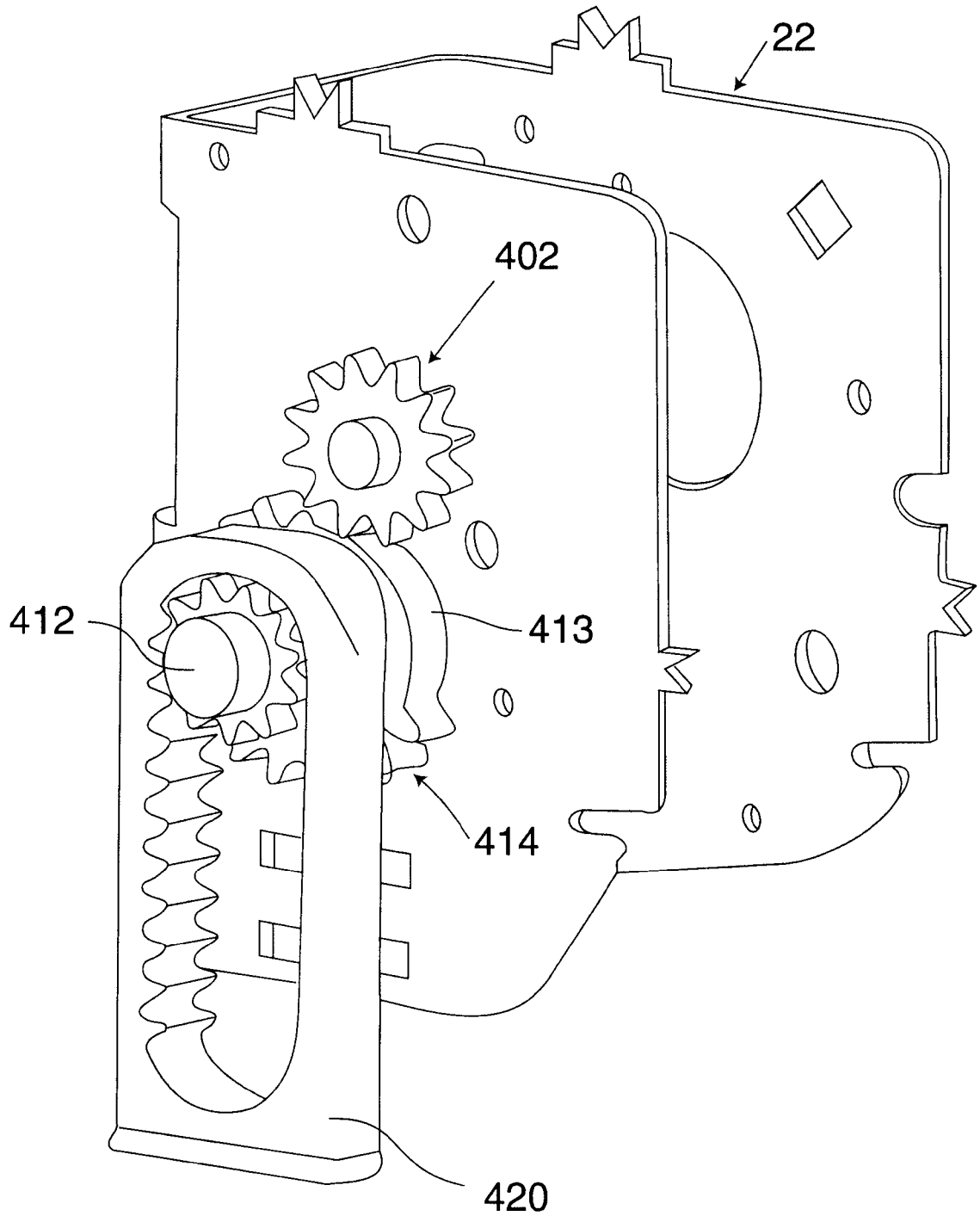
FIG. 3 is an isometric view illustrating the frame, a rack, gear unit and spur or driven gear.
Figure 4:
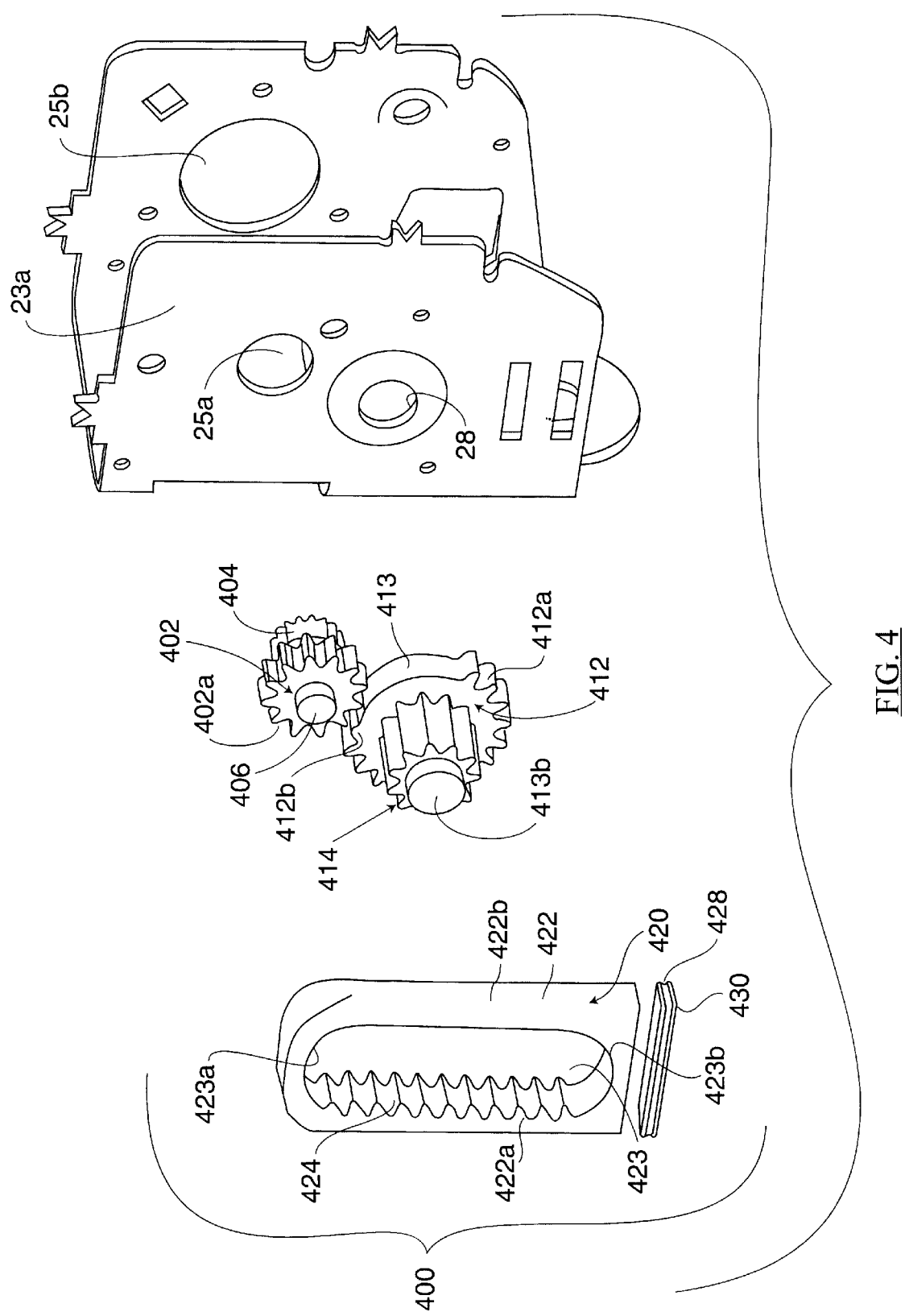
FIG. 4 is an assembly view of the components shown in FIG. 3.

The rack 420 includes a thin frame 422 including parallel walls or sides 422a and 422b defining a central opening 423. The rack 420 can be made from a single steel piece or of a laminated steel construction. One side 422a of the rack 420, adjacent opening 423 includes a plurality of gear teeth 424. The top 426a and bottom 426b of the rack 420 define arcuately shaped sectors 423a and 423b of the opening 423. The inside radii of these arcuate portions is sized to receive the gear 414 (see FIGS. 2 and 3). The lower end 425 of the bottom 426b of the rack 420 is generally flat to conform with a mating flat top surface of an elastomeric seal such as Viton, 430. The seal 430 includes a groove 428 thereabout to enhance its sealing potential with the housing. The rack 420 and seal 430 are slidingly supported within a rectangular bore 460d formed in housing sections 460a,b (see FIGS. 5 and 7). Secured within a tube 460e of the lower housing part 460b is the pyrotechnic unit 450 which is activated by a control signal received from a control unit 452 which receives information from various crash sensors 454 located throughout the vehicle. The tube 460e can be oriented as shown, or pointing to the right or down.

The housing part 460b encloses at least the lower portion of the rack 420 and seal 430 and in cooperation with the seal 430 defines an expansion chamber 470. Upon activation of the pyrotechnic unit 450, products of combustion (such as gas and heat) are produced and introduced into chamber 470 to urge the rack 420 upwardly. The seal 430 traps the gases within the expansion chamber 470.

The operation of the retractor 20 and pretensioner 400 is described below. FIGS. 1 and 2 show the relationship of the various components during normal, pre-crash operation. During this mode of operation, the retractor 20 is free to operate and have the webbing 31 protracted and retracted under the influence of the rewind spring 58 and the large diameter gear 412 is not connected to the spur gear 402 (see FIG. 3) and as such, the pretensioner is not connected (de-clutched) from the retractor 20. If the vehicle deceleration and/or webbing withdrawal rate exceeds predefined limits the vehicle and web sensor 302 and 300 would become activated and temporarily lock the retractor 20. As can be seen, the gear unit 410 functions as a simple clutch to selectively engage and disengage the gears.

During an accident, the vehicle and web sensors 300 and 302 respectively will lock the lock wheel 110 to prevent seat belt from being protracted. Relatively simultaneously, the control unit 452 will activate the pyrotechnic unit 450 which will generate products of combustion forcing the rack 420 upwardly. Since the rack 420 is always in driving engagement with the smaller diameter gear 414, movement of the rack will cause the gear unit 410 to rotate. As the large diameter gear 412 is physically attached to the smaller diameter gear 414, it will also rotate. After the large diameter gear 412 rotates about 20° it is brought into engagement with the spur gear 402, causing same to reverse rotate the spool 24 to retract the seat belt 31 thereon to eliminate a determinable about of slack about the occupant about whom the seat belt 31 is secured. As is known in the art, the lock wheel 110 is free to be rotated in a reverse manner and will ratchet across the tooth portion of the lock pawl 120.

The rack 420 will be moved upwardly within upper housing portion 460a. The gear ratio between the rack 420 and the smaller diameter gear 414 and the gear design of the large diameter gear 412 are chosen such that when the rack is in its upward position gear 412 has been rotated sufficiently to place the toothless portion 413 again out of engagement with the spur gear 402 to decouple or declutch the pretensioner 400 from the retractor 20.

As the accident progresses, the occupant will begin or continue to move forward as momentum is transferred from the decelerating vehicle to the occupant. Under these conditions the web and vehicle sensors 300 and 302 respectfully will maintain the retractor 20 in its locked mode of operation. As the occupant continues to load the seat belt 31, forces are communicated to the retractor spool 24 which are resisted by the torsion bar 100. At some determinable level of force the torsion bar (and spool) will begin to twist in a controlled manner (its end 106 being locked by wheel 110) generating a reaction force transmitter to the spool 24 which acts in opposition to the applied belt force permitting the occupant to move forward in a controlled manner while crash energy is dissipated by the energy needed to twist the torsion bar 100. As the spool (and torsion bar 100) rotate, the seat belt 31 previously wound about the spool 24 is permitted to protract in a controlled manner.

As mentioned above, the pretensioner of the present invention can also be used as a buckle pretensioner. In this embodiment the a seat belt buckle 33 (shown in phantom line in FIG. 1) is attached via a short length of seat belt) to a spool 24 supported within a frame 22 such as that used with retractor 20. The spool may also be supported in the frame by a torsion bar 100. The length of seat belt extending from the spool to the buckle is chosen to be long enough to adequately present the buckle relative to the seat to permit entry of a mating tongue. The rewind spring 58 and the sensors 300 and 302 may optionally be eliminated. Upon sensing of an accident, the rack 420 is moved to cause the spool to rotate to cause the seat belt to become wound thereabout and in so doing drawing the buckle 33 downward toward the mounting location of the frame to thereby remove slack about the occupant.

Many changes and modifications in the above-described embodiment of the invention can, of course, be carried out without departing from the scope thereof. It should be appreciated that any retractor, including those that do not use energy absorbing components such as a retractor having a spool directly supported upon the frame, can be used with the present invention. Accordingly, that scope is intended to be limited only by the scope of the appended claims.

I claim:

1. An apparatus (20, 400) comprising:
    driven means (402) operatively linked to a rotationally supported spool (20) to rotate the spool (24) in a direction of retraction to cause a seat belt (22) wound thereabout to retract;
    a belt tightener comprising:
        first drive means (410, 412, 414) for driving the driven means, the first drive means comprising a gear unit (410) having a first drive member (412) initially uncoupled from the driven means and which as it rotates is placed into driving engagement with the driven means and which is thereafter rotated to a condition of disengagement with the driven means to permit the spool to rotate free of the belt tightener;
        second drive means (420) operably connected to the first drive means to cause same to rotate;
    wherein the second drive means includes a movable toothed or geared rack (420).

2. The apparatus as defined in claim 1 wherein the first drive means is a step-up gear unit.

3. The apparatus as defined in claim 2 wherein the gear unit includes a second drive member (414) having a diameter less than that of the first drive member.

4. The apparatus as defined in claim 1 wherein the rack includes a body having an oblong opening (423) therein and wherein the rack teeth are located on one side of the opening.

5. The apparatus as defined in claim 1 wherein a pyrotechnic means for producing products of combustion is operatively communicated to the rack (410) to cause the rack to move to its activated position.

6. The apparatus as defined in claim 5 wherein the spool is part of a seat belt retractor which includes an energy absorbing means (100) for permitting the controlled protraction of the seat belt from the retractor during an accident.

7. The apparatus as defined in claim 1 wherein the spool is part of a seat belt retractor.

8. The apparatus as defined in claim 1 wherein the spool is linked to a seat belt buckle.

9. The apparatus as defined in claim 1 wherein the rack includes opposing sides laterally stabilized by adjacent portions of a housing to control engagement with the first drive means.

10. The apparatus as defined in claim 9 including a seal below the rack to prevent leakage of pressurized gases out of an expansion chamber located below the rack.

11. The apparatus as defined in claim 1 wherein the first drive member (412) includes a plurality of gear teeth about a determinable portion of its circumference and a toothless sector.

12. An apparatus (20, 400) comprising:
    driven means (402) operatively linked to a rotationally supported spool (20) to rotate the spool (24) in a direction of retraction to cause a seat belt (22) wound thereabout to retract;
    a belt tightener comprising:
        first drive means (410, 412, 414) for driving the driven means, the first drive means comprising a gear unit (410) having a first drive member (412) initially uncoupled from the driven means and which as it rotates is placed into driving engagement with the driven means and which is thereafter rotated to a condition of disengagement with the driven means to permit the spool to rotate free of the belt tightener;
        second drive means (420) operably connected to the first drive means to cause same to rotate;
    wherein the first drive member (412) includes a plurality of gear teeth about a determinable portion of its circumference and a toothless sector.

13. The apparatus as defined in claim 12 wherein prior to activation of the second drive means the toothless sector is maintained out of driving engagement with the driven means.

14. An apparatus (20, 400) comprising:
    a first gear (402) operatively linked to a rotationally supported spool (20) to rotate the spool (24) in a direction of retraction to cause a seat belt (22) wound thereabout to retract;

a belt tightener comprising:

a slidable rack (420) including parallel first and second sides, a top and bottom forming an opening, a first of the sides including teeth movable into and out of engagement with the first gear;

a housing disposed adjacent each of the first and second sides for guiding the movement of the rack.

15. The apparatus as defined in claim 14 including a step-up gear unit interposing the rack and the first gear.

16. The apparatus as defined in claim 15 wherein the step-up gear unit includes a second gear driven by the teeth of the rack and a third gear having a diameter greater than that of the second gear.

17. The apparatus as defined in claim 16 wherein the third gear includes a portion devoid of gear teeth and wherein the movement of the rack places the third gear into driving engagement with the first gear and wherein continued motion of the rack causes the third gear to move out of driving engagement with the first gear.

18. The apparatus as defined in claim 14 including a retractor having the spool and an energy absorbing means joined to the spool for permitting the spool to rotate in a belt protraction direction subsequent to the spool being locked during an accident.

19. An apparatus (20, 400) comprising:

a first gear (402) operatively linked to a rotationally supported spool (20) to rotate the spool (24) in a direction of retraction to cause a seat belt (22) wound thereabout to retract;

a belt tightener comprising:

a slidable rack (420) including parallel first and second sides forming an opening, a first of the sides including teeth movable into and out of engagement with the first gear;

a housing disposed adjacent each of the first and second sides for guiding the movement of the rack.

* * * * *